United States Patent [19]

Somemiya et al.

[11] Patent Number: 4,481,332

[45] Date of Patent: Nov. 6, 1984

[54] HEAT RESISTANT POLYPHENYLENE ETHER COMPOSITION

[75] Inventors: Akiyoshi Somemiya, Akashi; Shunichu Miyashita; Junichi Ishizu, both of Kobe, all of Japan

[73] Assignee: Kanegafuchi Kagaku Kogyo Kabushiki Kaisha, Osaka, Japan

[21] Appl. No.: 559,266

[22] Filed: Dec. 8, 1983

Related U.S. Application Data

[63] Continuation-in-part of Ser. No. 425,697, Sep. 28, 1982, abandoned.

[30] Foreign Application Priority Data

Sep. 28, 1981 [JP] Japan .................. 56-154515

[51] Int. Cl.³ .............. C08G 65/44; C08G 65/40; C08L 71/04
[52] U.S. Cl. .................. 525/132; 528/211; 525/68; 525/474
[58] Field of Search ............ 524/508; 528/211; 525/132

[56] References Cited

U.S. PATENT DOCUMENTS

| | | | |
|---|---|---|---|
| 3,370,107 | 2/1968 | Barth | 528/219 |
| 3,787,532 | 1/1974 | Carmelite et al. | 524/508 |
| 4,156,771 | 5/1979 | Loucks et al. | 524/132 |
| 4,335,233 | 6/1982 | Somemiya et al. | 528/211 |

FOREIGN PATENT DOCUMENTS 0037124 10/1981 European Pat. Off. .......... 211/
57-205424 12/1982 Japan .................. 528/211

*Primary Examiner*—Veronica P. Hoke
*Attorney, Agent, or Firm*—Antonelli, Terry & Wands

[57] ABSTRACT

A heat resistant polymer composition having improved processability and oxidative deterioration resistance which comprises a blend of a polyphenylene oxide copolymer and a polymer prepared by radical polymerization of one or more kinds of monomers having at least one vinyl group in the molecule, the polyphenylene oxide copolymer having a polyphenylene ether structure derived from a phenol compound and containing nitrogen-containing monomer units derived from at least one of the compounds of the general formulas:

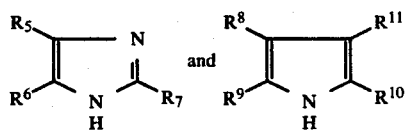

wherein $R^5$ to $R^{11}$ are hydrogen, a hydrocarbon group or a substituted hydrocarbon group, provided that $R^5$ and $R^6$, $R^8$ and $R^9$, and $R^{10}$ and $R^{11}$ can be joined to form a substituted or nonsubstituted aromatic ring.

8 Claims, No Drawings

HEAT RESISTANT POLYPHENYLENE ETHER COMPOSITION

CROSS-REFERENCE TO RELATED APPLICATION

This is a continuation-in-part of application Ser. No. 425,697 filed on Sept. 28, 1982, now abandoned.

BACKGROUND OF THE INVENTION

The present invention relates to a polymer composition containing a polyphenylene ether copolymer, which has excellent physical properties such as heat resistance, flowability, mechanical property, impact resistance and electric property and excellent acid and alkali resistances.

A polyphenylene ether (polyphenylene oxide) is prepared by condensation polymerization of a phenol compound based on the oxidative coupling reaction. The polymer has good mechanical property and heat resistance, but is not always good in oxidative deterioration resistance, and the molding processing thereof is attended with difficulties. Many attempts have hitherto been made in order to improve these defects. For instance, there are known (1) a process in which a polyphenylene oxide is blended with a vinyl polymer, as disclosed in Japanese unexamined patent publication (Tokkyo Kokai) No. 7069/1967 No. 39346/1972 and Japanese examined patent publication (Tokkyo Kokoku) No. 41021/1971 and No. 17812/1966, (2) a process in which styrene is graft-polymerized onto a polyphenylene oxide, as disclosed in Japanese examined patent publication No. 41102/1972, (3) a process in which a polyphenylene oxide is blended with polystyrene or a high impact resisting polystyrene, as disclosed in U.S. Pat. No. 3,383,435, and (4) a process in which 2,6-xylenol is copolymerized with other phenol compounds, as disclosed in Japanese unexamined patent publication No. 104935/1981, No. 104298/1975 and No. 46351/1976 and Japanese examined patent publication No. 11134/1980.

However, the above proposed process (4) has the disadvantage that a polymer having a high degree of polymerization is hard to obtain, and even if a polymer having a high degree of polymerization is obtained, no remarkable advantage in physical properties is seen as compared with a conventional polyphenylene oxide, i.e. poly-2,6-dimethylphenylene oxide. The above process (2) is complicated in process steps and is disadvantageous in this respect. A process advantageous in practical use is the processes (1) and (3). The polymers prepared by these processes are considered to be the most practical, but the oxidative deterioration resistance is still insufficient, since chemical characteristics of a polyphenylene oxide itself are not improved.

In accordance with the present invention, there is provided a heat resistant polymer composition which comprises a blend consisting essentially of (a) 1 to 99 % by weight of a polyphenylene oxide copolymer prepared by oxidative coupling polymerization of a phenol compound having the general formula (1):

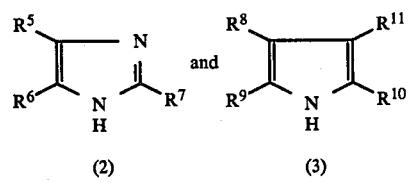

wherein $R^1$, $R^2$, $R^3$ and $R^4$ are hydrogen, a hydrocarbon group or a substituted hydrocarbon group, and at least one member selected from the group consisting of nitrogen-containing compounds having the general formulas (2) and (3):

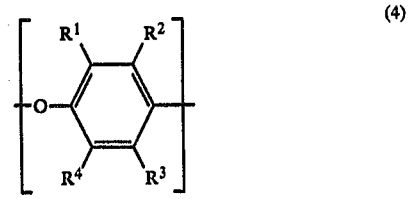

wherein $R^5$ to $R^{11}$ are hydrogen, a hydrocarbon group or a substituted hydrocarbon group, provided that two adjacent groups, $R^5$ and $R^6$, $R^8$ and $R^9$, and $R^{10}$ and $R^{11}$ can be joined to form a substituted or nonsubstituted aromatic ring, (b) 99 to 1% by weight of a polymer prepared by radical polymerization of one or more kinds of monomers having at least one vinyl group in the molecule.

The composition of the present invention has excellent processability and oxidative deterioration resistance with excellent heat resistance, mechanical property, flowability, impact resistance, electric property and chemical resistance. Therefore, it can be used for various purposes, and is a resin material of new type usable, for instance, as molding materials, films, sheets and fibers.

DETAILED DESCRIPTION

The polyphenylene oxide copolymers (a) used in the present invention are polymers containing in the main chain 85 to 99.9% by weight of monomer units represented by the general formula (4):

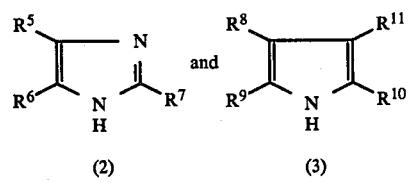

wherein $R^1$ to $R^4$ are hydrogen, a hydrocarbon group or a substituted hydrocarbon group, which are derived from phenol compounds of the general formula (1):

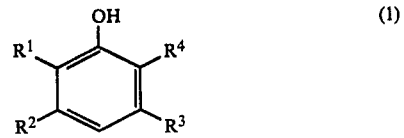

wherein $R^1$ to $R^4$ are as defined above.
Preferably, at least one of the groups $R^1$ to $R^4$ is an alkyl group having 1 to 5 carbon atoms.

Representative Examples of the phenol compounds (1) are, for instance, O-cresol, 2,6-dimethylphenol, 2,6-diethylphenol, 2,3,6-trimethylphenol, 2,6-dibutylphenol, 2-methyl-6-cyclohexylphenol, 2-methyl-6-ethylphenol, and the like. The phenol compounds may be employed alone or in admixture thereof.

Representative nitrogen-containing compounds used in the present invention are heterocyclic compounds represented by the general formulas (2) and (3):

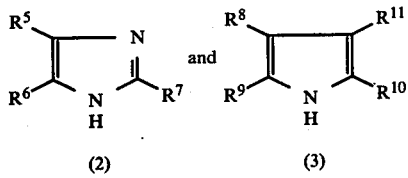

wherein $R^5$ to $R^{11}$ are hydrogen, a hydrocarbon group or a substituted hydrocarbon, the carbon number of the hydrocarbon group and the substituted hydrocarbon group being usually from 1 to 20, provided that two adjacent groups, $R^5$ and $R^6$, $R^8$ and $R^9$, and $R^{10}$ and $R^{11}$ can be joined to form a substituted or nonsubstituted aromatic ring.

The compounds (2) and (3) include, for instance, imidazole, indole, pyrrole, benzimidazole, carbazole, 3,4-dimethylcarbazole, and the like. The nitrogen-containing compounds may be employed alone or in admixture thereof.

Although the proportion of the nitrogen-containing compound used as a comonomer in the polyphenylene oxide copolymer may be arbitrarily selected, it is preferable that the copolymer contains 0.1 to 15% by weight of randomly distributed units of the nitrogen-containing compound comonomer (2) or (3) because the characteristics of a polyphenylene oxide can be effectively exhibited. In particular, the polyphenylene oxide copolymers containing 0.5 to 7% by weight of the above nitrogen-containing compound units are preferred in view of the physical and chemical properties of the polyphenylene oxide copolymer and the composition of the invention and the prevention of coloration of the polymer.

The polyphenylene oxide copolymer can be prepared by a process which is substantially the same as a known process for the polymerization of phenols by oxidative coupling. The polymerization is usually carried out by vigorously stirring a mixture containing the monomers, a catalyst, a promoter and a solvent, while introducing an oxygen-containing gas into the polymerization system. Examples of the polymerization catalyst are, for instance, copper-amine complex, cobalt-amine complex, manganese-alkoxide complex, bis(salicylaldehyde)ethylenediiminatocobalt, bis(salicylaldehyde)ethylenediiminatomanganese, bis(salicylaldehydealkyliminato)manganese, manganese-amine-phenoxide complex, and the like. Examples of the promoter are, for instance, amines, alkalis, alkoxides, phenoxides, and the like. In case that the copolymer having a high degree of polymerization is desired, it is desirable to use a catalyst containing manganese. The catalyst may be employed in an amount equal to or slightly greater than that in a conventional process for the preparation of polyphenylene oxide. Any organic solvents may be employed as a reaction medium, including benzene, toluene, chloroform, methylene chloride, carbon tetrachloride, acetone, methyl ethyl ketone, ethanol, methanol, propanol, ethyl acetate, tetrahydrofuran, dimethylformamide and dimethylsulfoxide. The solvents may be employed alone or in admixture thereof. The polymerization temperature may be the same as that for the homopolymerization of phenols. Usually, the polymerization is carried out at a temperature of not more than 80° C. to prevent possible side reactions. The copolymers usuable as engineering plastics can be obtained by the polymerization for 3 to 60 minutes, but preferably the polymerization is carried out from 5 minutes to 10 hours, in the case of a batchwise polymerization. The copolymer can also be prepared by a continuous polymerization method, for instance, by the methods for continuous polymerization of phenols disclosed in Japanese examined patent publication (Tokkyo Kokoku) Nos. 28919/1974 and 17077/1977. A manner for recovery of the product varies depending on the polymerization system. If the product is obtained from the system in the form of a solution, the copolymer is precipitated, for instance, by adding an alcohol containing a slight amount of an acid to the reaction mixture and then recovered. If a precipitation polymerization method as disclosed in Japanese publication No. 28919/1974 is employed, polymer particles are separated from the reaction mixture and washed with an alcohol containing a slight amount of an acid.

The polyphenylene oxide copolymers have improved chemical characteristics such as heat resistance as well as excellent physical characteristics, and are compatible with wider range of vinyl polymers as compared with a conventional polyphenylene oxide. The processability and oxidative deterioration resistance of the polyphenylene oxide copolymers are improved by blending with vinyl polymers. It is also possible to employ the polyphenylene oxide copolymers as modifiers for the vinyl polymers. The use of the copolymers as modifiers is effective in improving the heat stability and tensile strength of the vinyl polymers, and also in improving the processability of the vinyl polymers because the viscosity is increased so as to be easily processed.

The polymers (b) to be blended with the polyphenylene oxide copolymers (a) are homopolymers and copolymers prepared by radical polymerization of one or more kinds of monomers containing at least one vinyl group. Representative examples of the monomers containing at least one vinyl gorup are styrene compounds such as styrene, α-methylstyrene and chlorostyrene, ethylene, propylene, maleic anhydride, acrylic acid esters such as methyl acrylate, ethyl acrylate, propyl acrylate and t-butyl acrylate, methacrylic acid esters such as methyl methacrylate, ethyl methacrylate, propyl methacrylate and t-butyl methacrylate, acrylonitrile, methacrylonitrile, alkyl vinyl ketones such as methyl, ethyl, propyl and t-butyl vinyl ketones, diene compounds such as butadiene, 1,3-pentadiene, isoprene and chloroprene, vinyl acetate, acrylic acid, methacrylic acid, vinyl chloride, vinylidene chloride, and other vinyl monomers.

The polyphenylene oxide copolymer (a) containing nigrogen can be blended with the above-mentioned polymer (b) in arbitrary proportions, to provide a blend of 1 to 99% by weight of the nitrogen-containing polyphenylene oxide copolymer and 99 to 1% by weight of the polymer (b) derived from a vinyl group-containing monomer. Preferably, the ratio of the copolymer (a) to the polymer (b) is from 10:90 to 90:10 by weight, especially 20:80 to 80:20 by weight. The process for preparing the composition of the invention is not particularly limited. For instance, a process using a Banbury mixer or an extruder and a process in which polymers (a) and (b) are precipitated together from a solution of the polymers in a solvent, are adoptable.

In order to avoid the thermal deterioration of the polymers (a) and (b) in molding, a heat stabilizer is usually incorporated in the composition. All heat stabilizers known as those for polyphenylene oxide can be used. Examples of the heat stabilizer are, for instance, phosphorous acid esters such as triphenyl phosphite and tricresyl phosphite, phosphoric acid esters such as triphenyl phosphate and tridecyl phosphate, phosphoric amides such as phosphoric tri(N-methylanil)-amide and phosphoric trianilamide, phosphonic amides such as phosphorous trianilamide, boron oxide, borates such as catechol borate, metal carboxylates such as oxybis(diacetoxyboron), sulfides, hindered phenol compounds, organometallic compounds such as organo tin compounds, and the like. These stabilizers may be employed alone or in admixture thereof. A smaller amount of a heat stabilizer than in the case of a polyphenylene oxide homopolymer is sufficient for the composition of the invention, and consequently articles having more excellent properties are obtained. The heat stabilizer is employed usually in an amount of 0.05 to 6 parts by weight per 100 parts by weight of the blend of the polymers (a) and (b).

Additives used in general thermoplastic resins, e.g. glass fibers, calcium carbonate, titanium white, ultraviolet absorbent, flame retarder and colorant, can also be employed in the present invention. The present inventors already proposed polyphenylene oxide copolymers of phenol compounds and aniline compounds (U.S. Pat. No. 4,335,233). The blends of the polyphenylene oxide copolymers containing heterocyclic amine compounds with vinyl polymers according to the present invention have a higher affinity for fillers, particularly glass fibers, than blends of the polyphenylene oxide copolymers containing aniline compounds proposed in the U.S. patent with vinyl polymers. When incorporated with fillers, the blends of the present invention show further improved properties.

The composition of the present invention containing the nitrogen-containing polyphenylene oxide copolymer (a) and the polymer (b) prepared by radical polymerization of one or more kinds of monomers containing at least one vinyl group is superior, particularly in flowability and resistance to thermal deterioration, to a composition containing a polyphenylene oxide instead of the nitrogen-containing polyphenylene oxide copolymer. It is considered that these advantages are based on that the nitrogen-containing compounds (2) and (3) has been copolymerized into a polyphenylene oxide, and that the nitrogen-containing polyphenylene oxide copolymers (a) have an excellent compatibility with the polymers (b) derived from vinyl group-containing monomers. Since the defects of polyphenylene oxide polymers are eliminated and the application as engineering plastics to various uses has now become possible, the composition of the invention is of great value.

The representative heat resistant polymer compositions of the present invention are those containing, as a polymer (b), homopolymers or copolymers containing as an essential component, units of a styrene compound of the general formula (5):

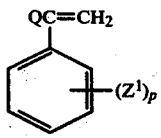

wherein Q is hydrogen or a lower alkyl group, e.g. an alkyl group having 1 to 4 carbon atoms, $Z^1$ is vinyl group, a halogen or a lower alkyl group, e.g. an alkyl group having 1 to 4 carbon atoms, and p is 0 or an integer of 1 to 5, an acrylic acid ester of the general formula (6):

wherein $Z^2$ is vinyl group, a halogen or a lower alkyl group, e.g. an alkyl group having 1 to 4 carbon atoms, or a methacrylic acid ester of the general formula (7):

wherein $Z^3$ is vinyl group, a halogen or a lower alkyl group, e.g. an alkyl group having 1 to 4 carbon atoms. Typical examples of these homopolymers and copolymers are, for instance, polystyrene, poly-α-methylstyrene, polychlorostyrene, styrene-chlorostyrene copolymer, styrene-60-methylstyrene copolymer, styrene-maleic anhydride copolymer, styrene-dimethyl maleate copolymer, styrene-methyl methacrylate copolymer, styrene-ethyl methacrylate copolymer, styrene-butyl methacrylate copolymer, styrene-methacrylic acid copolymer, styrene-acrylic acid copolymer, styrene-methyl acrylate copolymer, styrene-ethyl acrylate copolymer, styrene-butyl acrylate copolymer, styrene-methyl vinyl ketone copolymer, styrene-acrylonitrile copolymer, styrene-methacrylonitrile copolymer, styrene-butadiene copolymer, styrene-butadiene-methyl methacrylate copolymer, styrene-butadiene-methyl acrylate copolymer, styrene-butadiene-methacrylonitrile copolymer, styrene-butadiene-α-methylstyrene copolymer, styrene-butadiene-acrylonitrile copolymer, styrene-α-methylstyrene-acrylonitrile copolymer, butadiene-α-methylstyrene-acrylonitrile copolymer, methyl methacrylate-acrylonitrile copolymer, methyl methacrylate-α-methylstyrene copolymer, ethyl methacrylate-methacrylonitrile copolymer, ethyl methacrylate-acrylonitrile copolymer, propyl methacrylate-acrylonitrile copolymer, ethyl acrylate-butadiene copolymer, methyl acrylate-methacrylonitrile copolymer, ethyl acrylate-methacrylonitrile copolymer, methyl acrylate-acrylonitrile copolymer, ethyl acrylate-acrylonitrile copolymer, methyl acrylate-acrylonitrile-butadiene copolymer, and the like.

Some blend of the nitrogen-containing polyphenylene oxide copolymer (a) and the polymer (b) has no improved impact resistance. When the impact resistance is required, the blend may be incorporated with 3 to 65 parts by weight of an elastomer which shows an elasticity at ordinary temperature, per 100 parts by weight of the blend. Elastomers which form a continuous phase and/or a discontinuous phase with the blend of the polymers (a) and (b), are used in the present invention. In case of the elastomers which form a discontinuous phase, the shape and the particle size are not particularly strictly limited, but spherical particles having a particle size of 0.05 to 10 μm. are preferable.

The elastomers used in the invention include, for instance, homopolymers of diene compounds or derivatives thereof, copolymers of diene compounds or derivatives thereof with one or more kinds of monomers having at least one vinyl group copolymerizable therewith, silicone elastomers, acrylic elastomers, natural rubber, graft polymers (which comprehend interpolymers) in which one or more kinds of vinyl monomers are graft-polymerized onto the above-mentioned elastomers or rubbers, and the like. Representative examples of the elastomers are, for instance, polybutadiene, styrene-butadiene rubber (SBR), acrylonitrile-butadiene rubber (NBR), ethylene-propylene rubber (EP rubber), polyisoprene, polychloroprene, polybutadiene-styrene graft copolymer, polybutadiene-acrylonitrile-styrene graft copolymer, SBR-styrene graft copolymer, SBR-acrylonitrile-styrene graft copolymer, polybutadiene-methyl methacrylate-styrene graft copolymer, polybutadiene-methyl methacrylate-acrylonitrile-styrene graft copolymer, NBR-styrene graft copolymer, NBR-acrylonitrile-styrene graft copolymer, polybutyl acrylate-styrene graft copolymer, polybutyl acrylate-methylmethacrylate-acrylonitrile-styrene graft copolymer, polybutadiene-methyl methacrylate-methacrylonitrile graft copolymer, polymethylphenylsilicone-styrene graft copolymer, and the like.

According to the present invention, there is provided a polymer composition having well balanced excellent properties such as mechanical property, thermal characteristics, chemical characteristics and molding processability, and accordingly the invention is of great practical value.

The present invention is more specifically described and explained by means of the following Examples, in which all % and parts are by weight unless otherwise noted. It is to be understood that the present invention is not limited to the Examples and various changes and modifications may be made in the invention without departing from the spirit and scope thereof.

To illustrate the preparation of the polyphenylene oxide copolymers (a) used in the present invention, the following Reference Examples are also given.

REFERENCE EXAMPLE 1

A mixture of 6.1 g. of 2,6-xylenol, 11.6 g. of indole, 9 g. of bis(salicylaldehyde)ethylenediiminato-manganese(II) ethylenediamine, 90 ml. of toluene and 60 ml. of ethanol was placed in a 300 ml. flask on a water bath at 50° C. The polymerization was carried out with vigorously stirring, while introducing oxygen gas to the flask. The precipitation of polymer particles was observed 10 minutes after the reaction was started. A part of the product was taken out with the lapse of time, and was washed with methanol containing a small amount of hydrochloric acid to give a light yellow polymer. The polymer was purified by reprecipitation. The intrinsic viscosity [η] of the obtained polymers in chloroform at 25° C. and the content of indole in the polymers were measured.

The results are shown in Table 1.

TABLE 1

| Reaction time (min.) | [η] | Content of indol (% by mole) |
|---|---|---|
| 10 | 0.08 | trace |
| 20 | 0.80 | 2.7 |
| 30 | 0.80 | 3.5 |
| 40 | 0.78 | 3.4 |
| 60 | 0.80 | 2.9 |
| 110 | 0.97 | 3.6 |

As a result of analysis of the polymers such as infrared spectrophotometry, nuclear magnetic resonance analysis and elemental analysis, it is considered that the copolymerization is caused by oxidation of N—H and C—H conjugated therewith of the nitrogen-containing compound.

In ultraviolet absorption spectrum, there were observed absorptions different from those of 2,6xylenol homopolymer. Also, in H—NMR spectrum, there was observed in the vicinity of δ 6 to 7 (TMS standard) an absorption which was not observed in the spectrums of 2,6-xylenol homopolymer and indole.

REFERENCE EXAMPLE 2

The procedure of Reference Example 1 was repeated except that 6.8 g. of imidazole was employed instead of 11.6 g. of indole and the polymerization was conducted for 3 hours, to give gray or greenish gray copolymer particles. It was found by the elemental analysis that the content of imidazole in the copolymer was 2% by mole. Also, the copolymer had a weight average molecular weight of 6,000.

REFERENCE EXAMPLE 3

The procedure of Reference Example 1 was repeated except that 6.7 g. of pyrrole was employed instead of 11.6 g. of indole and the polymerization was conducted for 3 hours, to give dark gray copolymer particles. The copolymer had a pyrrole content of 4.3% by mole.

EXAMPLE 1

In toluene were dissolved 50 parts of a copolymer of 2,6-xylenol and 7% by mole of indole and 50 parts of polystyrene having an intrinsic viscosity [η] of 0.59 measured at 20° C. in benzene. A mixture (E) was obtained by adding methanol to the solution to precipitate the polymers. The mixture (E) was dried under reduced pressure at 80° C. for a whole day and night, and was pressed at 260° C. and 50 kg./cm.² for 8 minutes to give a film.

The flowability of the polymer blend and the tensile strength of the film were measured. The flowability was measured by employing a Koka type flow tester made by Shimadzu Corporation (Koka type B method flow) having a nozzle of 1 mm. in diameter and 10 mm. in length at 280° C. The tensile strength was measured according to Japanese Industrial Standard (JIS) K 7113.

The results are shown in Table 2.

COMPARATIVE EXAMPLE 1

Blends (F) and (G) were prepared in the same manner as in Example 1 except that two kinds of poly2,6-dimethylphenylene oxide (hereinafter referred to as "PPO") having a different intrinsic viscosity (measured at 25° C. in chloroform). Films were formed from the blends (F) and (G) and the properties were measured in the same manner as in Example 1.

The results are shown in Table 2.

TABLE 2

|  | Example 1 | Comparative Example 1 | |
|---|---|---|---|
|  | Blend (E) | Blend (F) | Blend (G) |
| Intrinsic viscosity [η] (25° C. in chloroform) | | | |
| 2,6-Xylenol-indole copolymer | 0.60 | | |
| PPO | | 0.67 | 0.53 |
| Tensile strength (kg./cm.$^2$) | 850 | 850 | 744 |
| Flowability (cm.$^3$/sec.) | $1.60 \times 10^{-2}$ | $0.28 \times 10^{-2}$ | $1.18 \times 10^{-2}$ |

It is observed in Table 2 that the blend (E) containing the nitrogen-containing polyphenylene oxide copolymer is clearly superior in flowability to the blend (F) containing the PPO homopolymer, though they show the same tensile strength. Also, the blend (G) which shows a flowability close to that of the blend (E) is inferior in tensile strength to the blend (E).

EXAMPLE 2 AND COMPARATIVE EXAMPLE 2

The procedure of Example 1 was repeated except that a copolymer of 2,6-xylenol and 6.5% by mole of imidazole having an intrinsic viscosity of 0.52 (Example 2) or PPO having an intrinsic viscosity of 0.50 (Comparative Example 2) was employed instead of the 2,6-xylenol-indole copolymer to give polymer blends, and the polymer blends were incorporated with a combination of additives as shown in Table 3, selected from (1) B$_2$O$_3$, (2) O=P(OC$_6$H$_5$)$_3$ and (3) N(C$_6$H$_5$)$_2$, to give polymer blends (H), (I), (J) and (K). The thermal deterioration test of the press-formed films obtained from the blends was made by heating for 96 hours in an oven of hot air circulation type maintained at 150° C. and measuring the gel fraction in the polymer. The gel fraction was measured by adding 60 ml. of toluene to 1 g. of a specimen, allowing to stand at 60° C. for 24 hours, centrifuging to separate the insoluble portion, and drying and weighing it, and is represented by percentage of the insoluble portion based on the weight of the specimen.

The results are shown in Table 3.

TABLE 3

|  | Example 2 | Comparative Example 2 | | |
|---|---|---|---|---|
|  | Blend (H) | Blend (I) | Blend (J) | Blend (K) |
| Intrinsic viscosity [η] (25° C. in chloroform) | | | | |
| 2,6-Xylenol-imidazole copolymer | 0.52 | | | |
| PPO | | 0.50 | 0.50 | 0.50 |
| Additive | (1) + (2) | (1) + (2) + (3) | (1) + (2) | none |
| Gel fraction (wt. %) | 0 | 57 | 60 | 60 |

As is clear from Table 3, the composition of the present invention has an excellent thermal deterioration resistance, in other words, an excellent thermal stability.

EXAMPLE 3 AND COMPARATIVE EXAMPLE 3

There were admixed 500 g. of the same 2,6-xylenol-indole copolymer as used in Example 1 and 500 g. of a high impact polystyrene (HIPS) (commercially available under the commercial name "Styron 470" made by ASAHI-DOW LIMITED). The mixture was extruded by a twinscrew extruder to give a pelletized blend.

The above procedure was repeated as Comparative Example 3 except that poly-2,6-dimethylphenylene oxide having an intrinsic viscosity of 0.60 was employed instead of the copolymer.

The results of the flowability test measured at 270° C. are shown in Table 4.

TABLE 4

|  | Ex. 3 | Com. Ex. 3 |
|---|---|---|
| Flowability (cm.$^3$/sec.) | $1.4 \times 10^{-2}$ | $1.07 \times 10^{-2}$ |

EXAMPLES 4 TO 6 AND COMPARATIVE EXAMPLES 4 TO 6

The procedure of Example 1 was repeated except that the 2,6-xylenol-indole copolymer was admixed with polymethyl methacrylate (PMMA), methyl methacrylate-styrene copolymer (PMS) (styrene content: 60%) or acrylonitrile-styrene copolymer (PAS) (styrene content: 80%) instead of polystyrene.

As a comparison, the above procedure was repeated except that PPO having an intrinsic viscosity [η] of 0.67 (25° C. in chloroform) was employed instead of the 2,6-xylenol-indole copolymer.

The results of the flowability test measured at 280° C. are shown in Table 5.

TABLE 5

|  | Copolymer (%) | PPO (%) | Vinyl polymer (%) | Flowability (cm.$^3$/sec.) | Transparency of blend |
|---|---|---|---|---|---|
| Ex. 4 | 50 | — | PMMA 50 | $1.45 \times 10^{-2}$ | transparent |
| Ex. 5 | 50 | — | PMS 50 | $2.02 \times 10^{-2}$ | transparent |
| Ex. 6 | 50 | — | PAS 50 | $0.92 \times 10^{-2}$ | slightly cloudy |
| Com. Ex. 4 | — | 50 | PMMA 50 | $1.10 \times 10^{-2}$ | slightly cloudy |
| Com. Ex. 5 | — | 50 | PMS 50 | $1.37 \times 10^{-2}$ | transparent |
| Com. Ex. 6 | — | 50 | PAS 50 | $0.62 \times 10^{-2}$ | opaque |

EXAMPLES 7 AND 8 AND COMPARATIVE EXAMPLES 7 AND 8

The procedure of Example 1 was repeated except that the 2,6-xylenol-pyrrole copolymer having an intrinsic viscosity of 0.67 or PPO having an intrinsic viscosity of 0.67 was blended with the polystyrene having an intrinsic viscosity of 0.59 in a ratio as shown in Table 6.

The results of the flowability test measured at 280° C. are shown in Table 6.

TABLE 6

|  | Ex. 7 | Ex. 8 | Com. Ex. 7 | Com. Ex. 8 |
|---|---|---|---|---|
| Amount of polymer (%) |  |  |  |  |
| 2,6-Xylenol-pyrrole copolymer | 90 | 10 | — | — |
| PPO | — | — | 90 | 10 |
| Polystyrene | 10 | 90 | 10 | 90 |
| Flowability (cm.³/sec.) | $0.40 \times 10^{-2}$ | $22.7 \times 10^{-2}$ | $0.10 \times 10^{-2}$ | $15.2 \times 10^{-2}$ |

Comparing the Examples with the corresponding Comparative Examples, it is clear that the composition of the present invention has a higher flowability than the composition containing PPO.

EXAMPLES 9 AND 10 AND COMPARATIVE EXAMPLE 9

The same 2,6-xylenol-indole copolymer as used in Example 1 was blended with a methyl methacrylate-styrene copolymer (PMS) (commercially available under the commercial name "ESTYRENE MS" made by Nippon Steel Chemical Co., Ltd.) and a glass fiber (commercially available under the commercial name "GLASRON CHOPPED STRANDS 03MA486A" made by Asahi Fiber Glass Co., Ltd.) by a twin-screw extruder (diameter: 20 mm). The mixture was pressed by a press at 260° C. for 8 minutes to give a film. Dumbbell test specimens were obtained from the film, and tensile strength was measured to estimate an effect of the incorporation of filler on physical properties.

The above procedure was repeated except that the glass fiber was not employed (Example 10) or a 2,6-xylenol-diphenylamine copolymer (diphenylamine content: 2.0% by mole) was employed instead of the 2,6-xylenol-indole copolymer (Comparative Example 9).

The results are shown in Table 7.

TABLE 7

|  | Ex. 9 | Ex. 10 | Com. Ex. 9 |
|---|---|---|---|
| Ingredient (part) |  |  |  |
| Glass fiber | 20 | 0 | 20 |
| 2,6-Xylenol-indole copolymer | 30 | 30 | — |
| 2,6-Xylenol-diphenylamine copolymer | — | — | 30 |
| PMS | 70 | 70 | 70 |
| Tensile strength (kg./cm.²) | 1050 | 710 | 1000 |

In addition to the ingredients used in the Examples, other ingredients can be used in the Examples as set forth in the specification to obtain substantially the same results.

What we claim is:

1. A heat resistant polymer composition which comprises a blend consisting essentially of (a) 1 to 99% by weight of a polyphenylene oxide copolymer prepared by oxidative coupling polymerization of a phenol compound having the general formula (1);

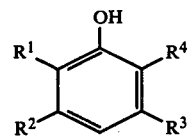

wherein $R^1$, $R^2$, $R^3$ and $R^4$ are hydrogen, a hydrocarbon group or a substituted hydrocarbon group, and at least one member selected from the group consisting of nitrogen-containing compounds having the general formulas (2) and (3):

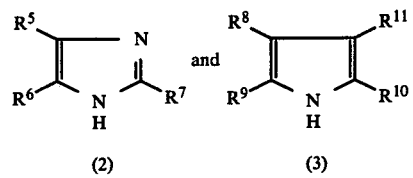

wherein $R^5$ to $R^{11}$ are hydrogen, a hydrocarbon group or a substituted hydrocarbon group, provided that two adjacent groups, $R^5$ and $R^6$, $R^8$ and $R^9$, and $R^{10}$ and $R^{11}$ can be joined to form a substituted or nonsubstituted aromatic ring,
(b) 99 to 1% by weight of a polymer prepared by radical polymerization of one or more kinds of monomers having at least one vinyl group in the molecule.

2. The composition of claim 1, wherein the phenol compound is a 2,6-disubstituted phenol.

3. The composition of claim 1, wherein the content of the nitrogen-containing compounds in the polyphenylene oxide copolymer is from 0.1 to 15% by weight.

4. The composition of claim 1, wherein the polymer (b) is a homopolymer or copolymer of a styrene compound.

5. The composition of claim 1, wherein the polymer (b) is a homopolymer or copolymer of an acrylate.

6. The composition of claim 1, wherein the polymer (b) is a homopolymer or copolymer of a methacrylate.

7. The composition of claim 1, further containing an elastomer which shows an elasticity at ordinary temperature.

8. The composition of claim 7, wherein the elastomer is contained in an amount of 3 to 65 parts by weight per 100 parts by weight of the blend.

* * * * *